J. L. ALDEN.
DUST SEPARATOR.
APPLICATION FILED APR. 17, 1917.
1,253,766.
Patented Jan. 15, 1918.
2 SHEETS—SHEET 2.
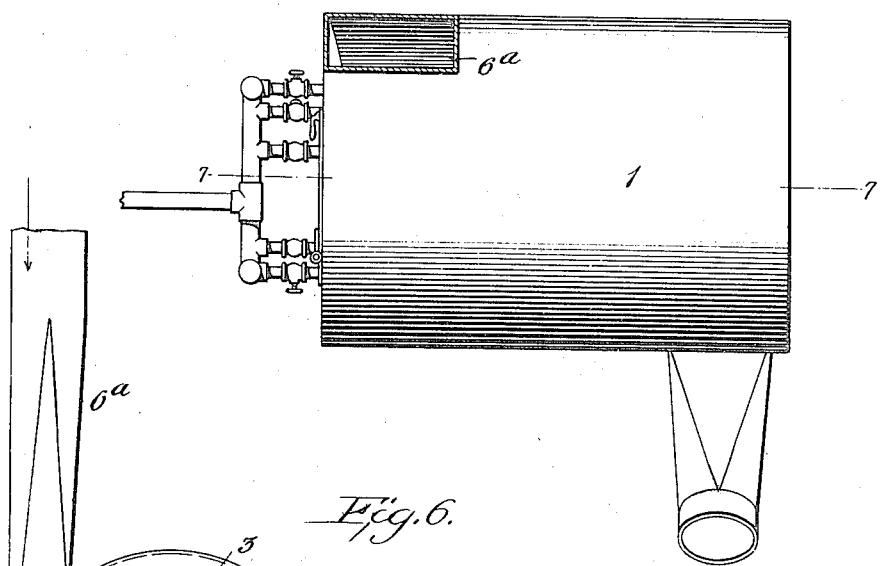
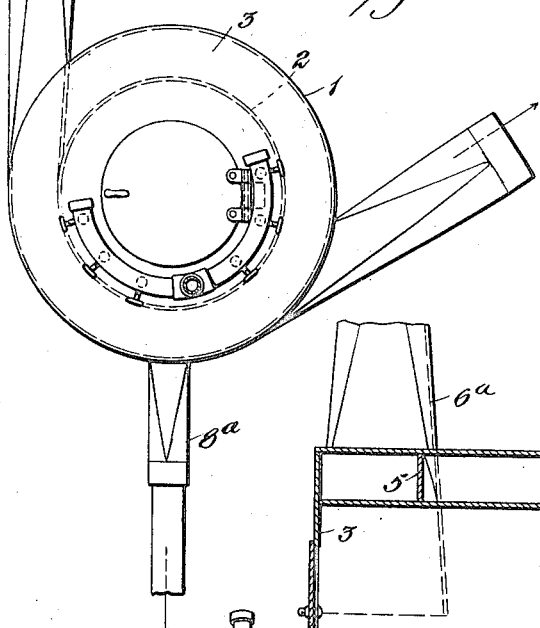
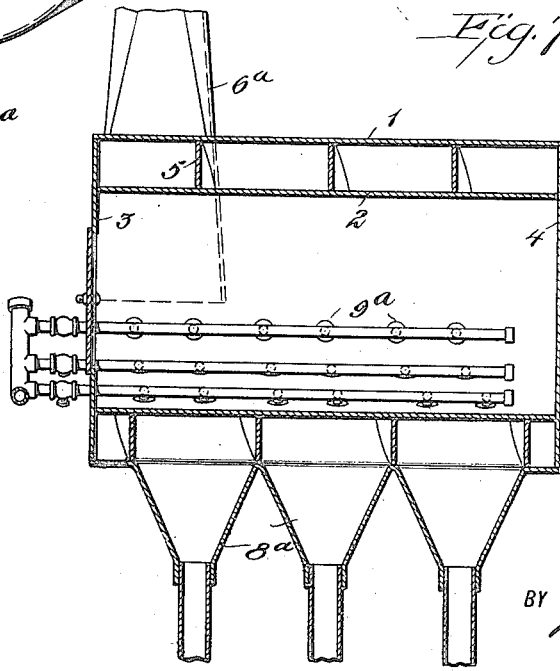
WITNESSES
INVENTOR
J. L. Alden.
BY
ATTORNEYS

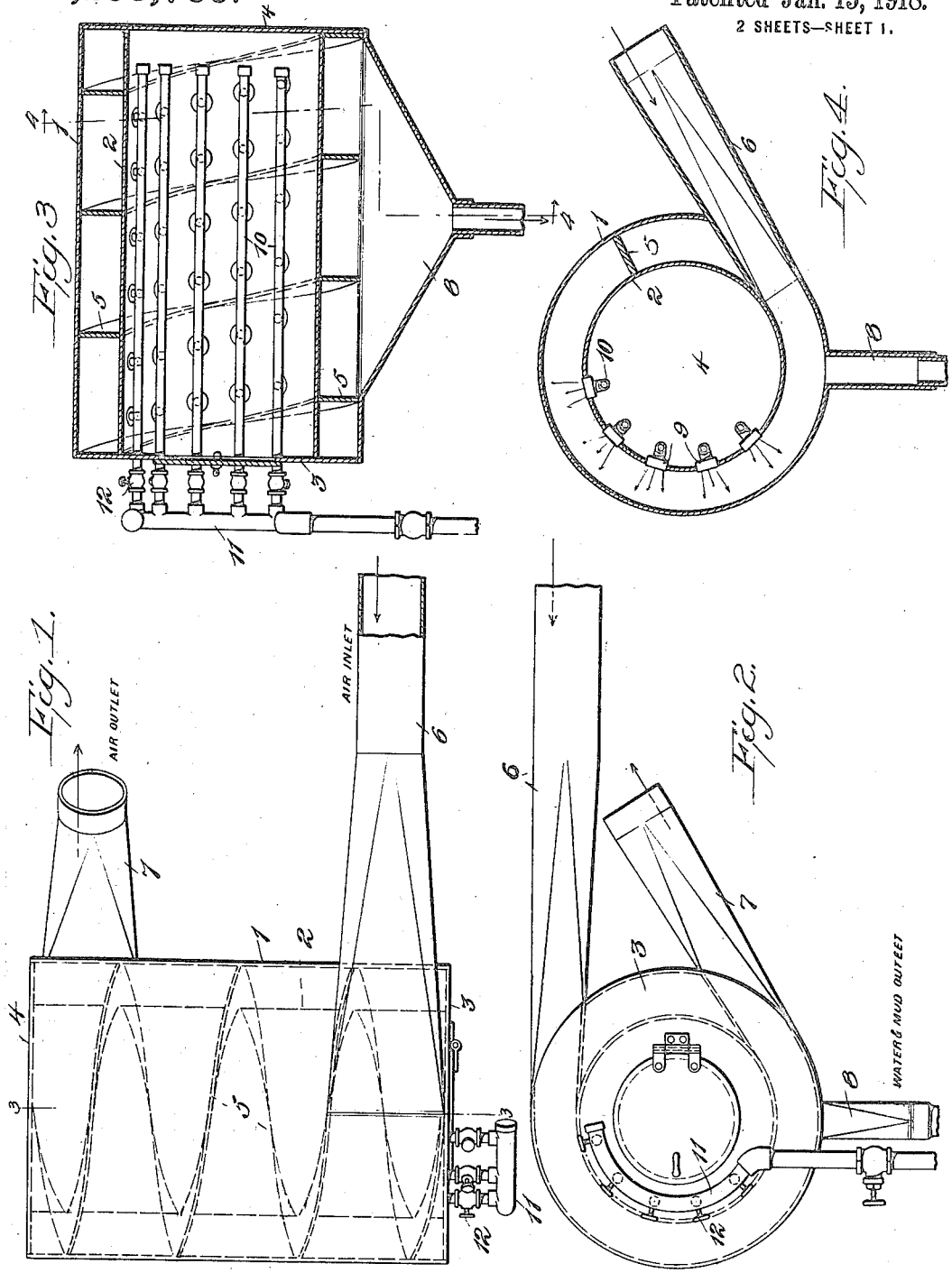

UNITED STATES PATENT OFFICE.

JOHN L. ALDEN, OF LUDLOW, MASSACHUSETTS.

DUST-SEPARATOR.

1,253,766. Specification of Letters Patent. Patented Jan. 15, 1918.

Application filed April 17, 1917. Serial No. 162,600.

*To all whom it may concern:*

Be it known that I, JOHN L. ALDEN, a citizen of the United States, and a resident of Ludlow, county of Hampden, and State of Massachusetts, have invented a new and Improved Dust-Separator, of which the following is a full, clear, and exact description.

This invention relates to separators of that type in which air, gas or other elastic fluid is separated from solid particles by the combined action of centrifugal force and water sprays.

The invention has for its objects to improve and simplify the construction and operation of gas purifiers or dust separators so as to be reliable and efficient in use, simple and inexpensive to manufacture and operate, and so designed as to have a maximum separating capacity for a minimum amount of space and power consumption.

A more specific object of the invention is to provide a separator in which the gas travels at high velocity through a helical course, in combination with means for removing the solid particles at one point in each convolution of the course, this fractional abstraction of a solid matter being carried to any desired extent according to the purity of the gas or air desired. More in detail, the invention has for its object to provide a helical conduit arranged with its axis horizontal and the bottom of each convolution open into a well or collection space for the solid particles which are thrown off by centrifugal force against the outer wall of each convolution, such separation being augmented by moistening the particles of solid matter by spraying water across the conduit from the inner and the outer wall, the water serving also to wash from the outer wall the separated solid particles so as to collect in the outlet chambers, conduits or spaces provided at the bottoms of the convolutions. With such and other objects in view the invention comprises the various novel features of construction and arrangement of parts hereinafter described and claimed in connection with the accompanying drawings, in which similar reference characters are employed to designate corresponding parts.

Figure 1 is a plan view of the separator.

Fig. 2 is an end view thereof.

Fig. 3 is a vertical view on the line 3—3 Fig. 1.

Fig. 4 is a transverse section on the line 4—4 Fig. 3.

Fig. 5 is a plan view of a modified form of separator.

Fig. 6 is an end view thereof.

Fig. 7 is a vertical section on the line 7—7 Fig. 5.

Referring to Figs. 1 to 4 of the drawings the body of the separator comprises an inner and outer cylinder 1 and 2, closed at either ends by heads 3 and 4. The space between these two cylinders is formed in to a helical conduit by means of a helical partition 5. At one end of this conduit is the dust laden air inlet or pipe 6 and at the opposite end is the purified air outlet pipe 7, the pipes 6 and 7 disposed tangential with respect to the separator body so that resistance to the flow through the machine is reduced to a minimum. The bottom of the outer cylinder is formed with a funnel shaped collecting chamber 8 common to the various convolutions so that once in each revolution or turn of the air passing through the machine there is an opportunity for the solid particles to be removed.

To facilitate the dust separation the inner cylinder is provided with a plurality of spray nozzles 9, so arranged as to spray water across the stream of air flowing through the machine whereby the particles become heavier and are more subject to the centrifugal force so that the particles will be thrown out against the outer walls of the convolutions. The water striking the outer walls will cause the separated dust to flow down to the common outlet 8. The nozzles 9 are connected with pipes 10 located within the inner cylinder and these pipes are connected with a supply manifold 11 outside the cylinders and any number of pipes may be used since each is provided with a valve 12.

While the machine may be effectively used for separating dust, fibers or other matter from air or other elastic fluid it is serviceable as a humidifier and by reason of the water particles being subjected to centrifugal force the humidified air delivered from the machine will be free from globules of water.

In the modification shown in Figs. 5 to 7, the air inlet 6ª is disposed vertically and furthermore the nozzles 9ª are arranged in groups at opposite sides of the bottoms of the convolutions or on opposite sides of the collecting chamber or outlets for the solid matter, thus the walls at the bottom of the convolutions can be effectively washed clean. Furthermore as shown in Fig. 7 the convolutions have individual outlets 8ª for the collection of the water and solid matter. This prevents the passage of water or solid particles practically from one convolution to the next.

Having thus described my invention I claim as new, and desire to secure by Letters Patent,

1. A separator of the class described comprising inner and outer cylinders, a helical partition dividing the space between the cylinders into a conduit having a smooth outer wall, a tangential inlet at one end of the conduit and a tangential outlet at the other, means in the bottoms of the convolutions of the conduit for removing solid matter and flow out of the conduit by gravity, and means for spraying water into the conduit from the inner wall to the outer wall.

2. A separator of the class described comprising inner and outer cylinders, a helical partition dividing the space between the cylinders into a conduit, a tangential inlet at one end of the conduit and a tangential outlet at the other, means in the bottoms of the convolutions of the conduit for removing solid matter and flow out of the convolutions by gravity, and nozzles in the inner cylinder for spraying water across the convolutions against the outer cylinder, and means for supplying water to the nozzles.

3. A separator of the class described comprising a conduit in the form of a helix having inlet and outlet ends, means in the conduit for collecting solid matter, water supply pipes within the helix, and nozzles connected with the pipes and passing through the inner wall of the conduit and directing water against the outer wall for assisting in separating and conducting away the solid matter.

JOHN L. ALDEN.